United States Patent
Templeton et al.

(10) Patent No.: US 9,016,569 B2
(45) Date of Patent: *Apr. 28, 2015

(54) ENCODING DATA IN MULTIPLE FORMATS

(71) Applicant: Square, Inc., San Francisco, CA (US)

(72) Inventors: Thomas Templeton, San Francisco, CA (US); Daniel Jeffrey Post, San Mateo, CA (US); Dominique Gilbert Toppani, San Francisco, CA (US); Alex Sutton, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/313,882

(22) Filed: Jun. 24, 2014

(65) Prior Publication Data

US 2015/0041542 A1 Feb. 12, 2015

Related U.S. Application Data

(63) Continuation of application No. 13/961,572, filed on Aug. 7, 2013, now Pat. No. 8,794,517.

(51) Int. Cl.
*G06K 5/00* (2006.01)
*G06K 7/01* (2006.01)
*G06Q 20/20* (2012.01)

(52) U.S. Cl.
CPC .............. *G06K 7/01* (2013.01); *G06Q 20/204* (2013.01)

(58) Field of Classification Search
USPC .......... 235/380, 375, 492, 487, 383, 493, 449
See application file for complete search history.

(56) References Cited

U.S. PATENT DOCUMENTS

| | | | |
|---|---|---|---|
| 6,176,429 B1 * | 1/2001 | Reddersen et al. | 235/462.25 |
| 2003/0066893 A1 | 4/2003 | Yap et al. | |
| 2005/0029360 A1 | 2/2005 | Rhelimi | |
| 2008/0302869 A1 | 12/2008 | Mullen | |
| 2012/0031969 A1 | 2/2012 | Hammad | |

* cited by examiner

*Primary Examiner* — Edwyn Labaze
(74) *Attorney, Agent, or Firm* — Novak Druce Connolly Bove + Quigg LLP

(57) ABSTRACT

Methods, systems, and apparatus, including computer programs encoded on computer storage media, for modulating card information between a card reader and a user device. One of the methods includes receiving, from a read head of the card reader, card information associated with a card. The card information is encoded in a first format to be sent to the user device at a first data rate. The card information is encoded in a second format to be sent to the user device at a second data rate lower than the first data rate. The card information is sent to the user device encoded in the first format and the second format.

16 Claims, 4 Drawing Sheets

ENCODING DATA IN MULTIPLE FORMATS

CROSS-REFERENCE TO RELATED APPLICATIONS

This application is a continuation application of, and claims priority to, pending U.S. patent application Ser. No. 13/961,572, filed on Aug. 7, 2013, entitled "Encoding Data in Multiple Formats." The disclosure of the foregoing application is incorporated herein by reference in its entirety.

TECHNICAL FIELD

This disclosure relates to modulation techniques for communication between devices.

BACKGROUND

Mobile card readers are available for magnetic stripe cards. A user provides a payment card with a magnetic stripe at the point-of-sale to a merchant. The merchant processes the card using a card reader, e.g., the card is swiped on a detachable card reader coupled to a merchant device, which can be a mobile device. A payment request is sent electronically to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

SUMMARY

This specification relates to modulation techniques for improving the reliability of communication between a detachable card reader and a user device. Mobile card readers can be detachably connected to mobile user devices, which can be common consumer devices, e.g., smartphones or tablet computers. However, communication between a card reader and such devices can be unreliable because of the widely varying hardware capabilities of user devices with which the card reader may need to communicate.

To improve the reliability of communication between a card reader and a user device, the card reader can encode the card information into multiple data packets that are then modulated at different respective data rates and sent to the user device as a single combined signal. If, due to hardware or software limitations of the user device, the user device is unable to demodulate a packet of data at a fast data rate, the user device can demodulate the card information using a portion of the signal modulated at a lower data rate.

In general, one innovative aspect of the subject matter described in this specification can be embodied in methods that include the actions of receiving, from a read head of the card reader coupled to the user device through an audio jack of the user device, card information encoded on a payment card; encoding the card information in a fast format packet to be sent to the user device at a first data rate; encoding the card information in a slow format packet to be sent to the user device at a second data rate lower than the first data rate; modulating the fast format packet and the slow format packet into a signal and sending the signal over the audio channel of the user device; initiating, at the user device, a demodulation process on a portion of the signal that corresponds to the fast format packet; determining that the demodulation process on the portion of the signal that corresponds to the fast format packet has failed; in response to determining that the demodulation process on the portion of the signal that corresponds to the fast format packet has failed, demodulating a portion of the signal that corresponds to the slow format packet; and decoding the card information from the demodulated slow format packet. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The actions include receiving the portion of the signal that corresponds to the slow format packet before or while performing the demodulation process on the portion of the signal corresponding to the fast format packet. Encoding the card information in a slow format packet comprises generating a preamble segment for the slow format packet that is longer than a preamble segment of the fast format packet. Encoding the card information in a slow format packet comprises generating multiple data segments, wherein each data segment encodes a portion of the card information; and generating a respective preamble and synchronization segment for each data segment of the multiple data segments.

In general, another innovative aspect of the subject matter described in this specification can be embodied in methods that include the actions of receiving, from a read head of the card reader, card information associated with a card; encoding the card information in a first format to be sent to the user device at a first data rate; encoding the card information in a second format to be sent to the user device at a second data rate lower than the first data rate; sending, to the user device, the card information encoded in the first format and the second format. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Sending, to the user device, the card information encoded in the first format and the second format comprises sending a signal over an audio channel of the user device. Sending, to the user device, the card information encoded in the first format and the second format comprises sending a signal over a data communications port of the user device. Sending, to the user device, the card information encoded in the first format and the second format comprises sending a portion of a signal that corresponds to the slow format before or while the user device is performing a demodulation process on a portion of the signal corresponding to the fast format. Encoding the card information in a slow format comprises generating a preamble segment for the slow format that is longer than a preamble segment of the fast format. Encoding the card information in a slow format comprises generating multiple data segments, wherein each data segment of the multiple data segments encodes a portion of the card information; and generating a respective preamble and synchronization segment for each data segment of the multiple data segments. Sending, to the user device, the card information encoded in the first format and the second format comprises sending a portion of the signal corresponding to the fast format before a portion of the signal corresponding to the slow format.

In general, another innovative aspect of the subject matter described in this specification can be embodied in methods that include the actions of receiving, from a card reader, a signal encoding card information associated with a card, wherein the card information is encoded in a first format received at a first data rate and a second format received at a second data rate that is lower than the first data rate; initiating a demodulation process on a portion of the signal that corresponds to the fast format; determining that the demodulation process on the portion of the signal that corresponds to the fast format has failed; in response to determining that the demodulation process on the portion of the signal that corresponds to the fast format has failed, demodulating a portion of the signal that corresponds to the slow format; and decoding the card information from the demodulated slow format. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include receiving a portion of the signal that corresponds to the slow format before or while performing the demodulation process on a portion of the signal corresponding to the fast format. Receiving, from the card reader, the signal encoding card information associated with a card comprises receiving the signal over an audio channel of the user device. Receiving, from the card reader, the signal encoding card information associated with a card comprises receiving the signal over a data communications port of the user device. The slow format comprises an initial preamble segment that is longer than an initial preamble segment for the fast format. Decoding the card information comprises identifying multiple data segments designated by respective synchronization segments, wherein each data segment of the multiple data segments encodes a portion of the card information; and assembling the card information using the multiple data segments.

In general, another innovative aspect of the subject matter described in this specification can be embodied in a card reader that is configured to encode card information associated with a card obtained from a read head into a fast format to be sent to a user device at a first data rate, encode the card information in a slow format to be sent to the user device at a second data rate lower than the first data rate, and send, to the user device, the card information encoded in the first format and the second format. Other embodiments of this aspect include corresponding computer systems, methods, and computer programs recorded on one or more computer storage devices, each configured to perform the actions of the card reader.

The foregoing and other embodiments can each optionally include one or more of the following features, alone or in combination. The card reader is further configured to send a portion of a signal that corresponds to the slow format before or while the user device is performing a demodulation process on a portion of the signal corresponding to the fast format packet. The card reader is configured to encode the card information in the slow format including generating multiple data segments, wherein each data segment of the multiple data segments encodes a portion of the card information, and generating a respective preamble and synchronization segment for each data segment of the multiple data segments.

Advantages may include one or more of the following. Modulating multiple information packets at different data rates increases the reliability of communication between a card reader and a user device. This can increase the likelihood that card information is read correctly on a first swipe and increases the types of user devices from which card information can be read reliably. Using multiple data segments, each having a respective preamble and synchronization segment, can further increase the reliability of reading card information by continually adjusting for clock drift when reading a signal. The multiple data packets improves the reliability of reading card information without requiring back-and-forth communication between the devices, e.g., without requiring the user device to acknowledge receipt and successful demodulation of the card information. This in turn gives both the merchant and the customer a less time-consuming and overall better user experience.

DETAILED DESCRIPTION

Figure 1:
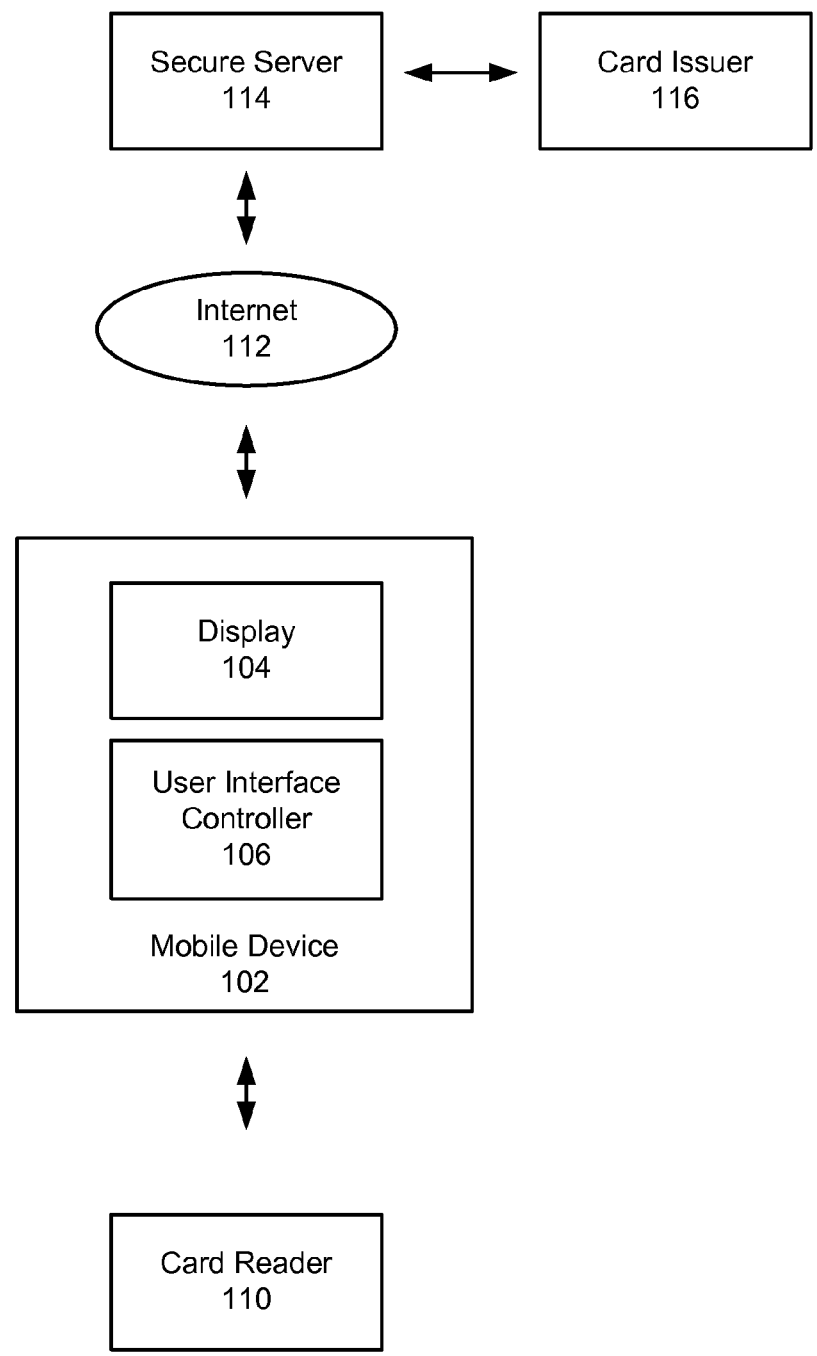
FIG. 1 is a schematic illustration of an example cardless payment system architecture.

FIG. 1 is a schematic illustration of an example system 100 for conducting a transaction using a card reader 110. The system 100 is capable of processing a payment transaction between a mobile computing device 102 and a card reader 110. The mobile computing device 102 can be a smart phone, tablet computer or laptop, or other data processing apparatus. The card reader 110 can be detachably connected to the mobile computing device 102. The card reader 110 is a device that reads data from a storage medium on a credit-card shaped card, e.g., from a magnetic stripe or embedded chip. In other words, the card reader 110 may not have a display or a keyboard, but the card reader 110 has an interface for inserting or swiping a card. For example, the system 100 can process the card according to the Europay, Mastercard, Visa (EMV) protocol.

The card reader 110 is attached to the mobile device 102 by a port of the mobile device 102. The port can be any appropriate type of port for sending signals to the mobile device. For example, the port can be a port for sending audio signals, e.g., an audio jack or headset jack of the mobile device 102. The port can also be a port for sending optical signals, e.g., an optical fiber port. The port can also be another kind of port for sending electrical signals to the mobile device. For example, the port can be a data communications port, e.g., a universal serial bus (USB) port, a charging port, or a port that has a combination of these or other functions, e.g., a data communications and power charging port.

The card reader 110 can read, on the card, a magnetic stripe or chip to obtain card information, e.g., a card number and a card expiration date. The card reader 110 then generates multiple data packets that encode the card information in a particular format and which are intended to be modulated at different respective data rates. Each packet can include multiple segments including preambles, synchronization segments, and multiple data segments that encode card information associated with the card. In this specification, a data packet is a data structure that includes one or more segments of data, e.g., a preamble, synchronization, and data segments, but does necessarily imply a packet that is sent over a network of devices and need not include network addressing or routing information.

The card reader 110 then generates a signal, e.g., an electrical signal, by modulating the multiple packets at their respective data rates, and sends the signal to the mobile device 102, e.g., over an audio channel or another port that connects the card reader 110 to the mobile device 102. The mobile device 102 receives the signal and demodulates the signal to reconstruct one or more of the data packets. The mobile device 102 can demodulate a portion of the signal corresponding to any one of the packets. If the mobile device 102 is unable to demodulate a portion of the signal having a particular data rate, e.g., because the data rate is too fast for the electronics of mobile device 102 to demodulate correctly, the mobile device 102 can demodulate a different portion of the signal having a lower data rate. Thus, the card reader 110 can provide the mobile device 102 with a robust signal with built-in redundancy to improve the reliability of communication between the card reader 110 and the mobile device 102.

The mobile device 102 can then transmit an authorization for the transaction to a secure server 114 for payment processing using an external network, e.g., the Internet 112. The secure server 114 can relay the transaction to the card issuer 116, which ultimately approves or denies the transaction. The card issuer 116 can communicate the approval or denial to the secure server 114, which can relay the card issuer's response to the mobile device 102.

The mobile device 102 includes a display 104 and a user interface controller 106. The user interface controller 106 can generate a user interface for directing the user in swiping cards for a payment transaction. The mobile device 102 can display the generated interface on the display 104. For example, the generated interface can instruct the user to swipe a card, inform the user that a swipe failed, and instruct the user that a card is expired, just to name a few examples.

Figure 2:
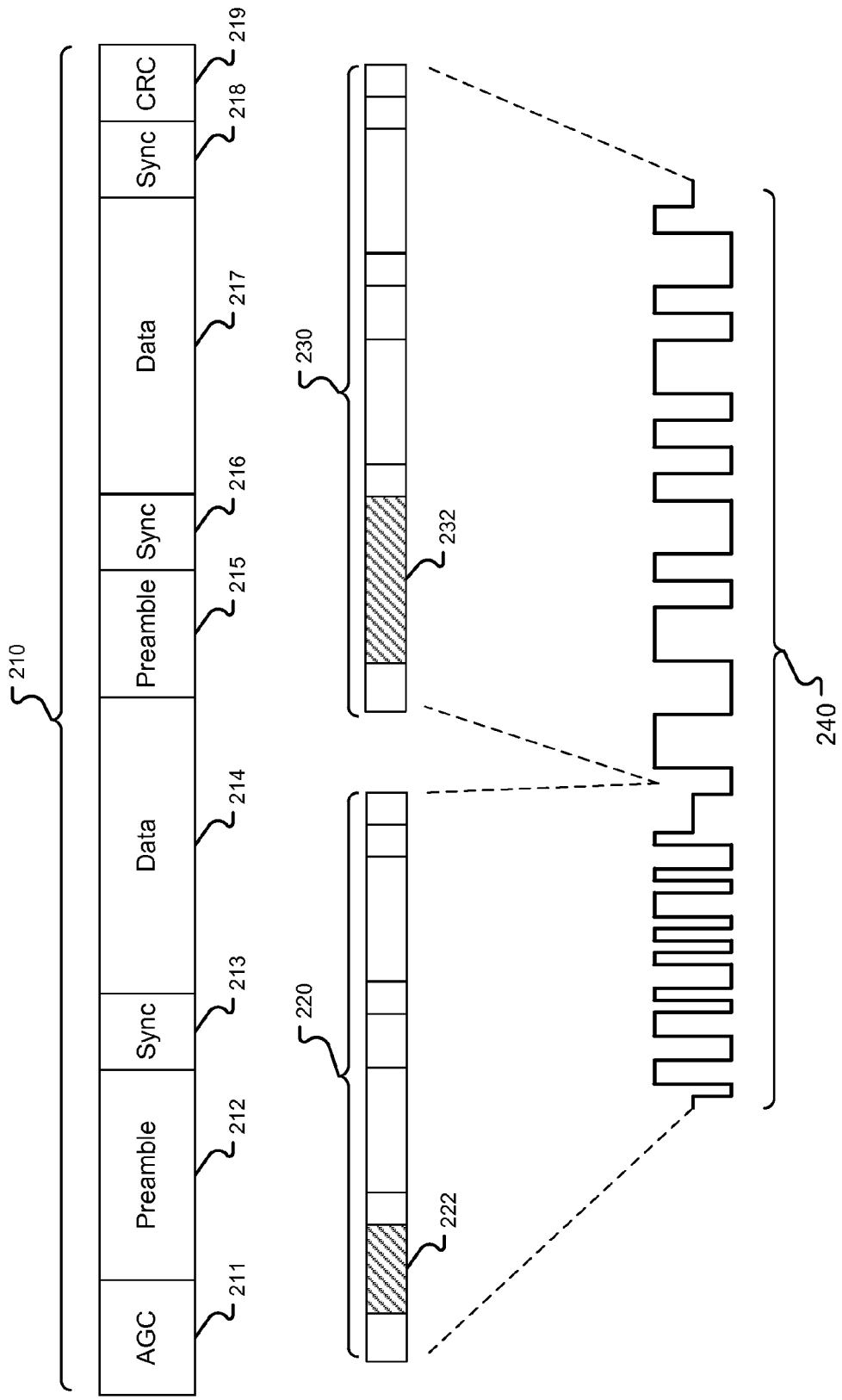
FIG. 2 is a diagram of a fast format packet and a slow format packet.

FIG. 2 illustrates example formats of example data packets. A card reader can generate a fast format packet 220 and a slow format packet 230 having the same general arrangement as shown by an example data packet 210. The card reader can then use the fast format packet 220 and the slow format packet 230 to generate a signal 240 that can be modulated and sent to a user device, e.g., over an audio channel of the user device.

The example data packet 210 includes multiple data segments that encode card information associated with a payment card. The card information can include a card number of the card, an expiration date of the card, a name of the card holder, in addition to other types of data. The data packet 210 also includes other segments for determining a data rate, synchronizing signal measurements with the data rate, and error checking An initial automatic gain control (AGC) segment 211 can be used for performing automatic gain control on the user device to adjust the gain of the received signal to an appropriate level. If the signal is weak, the user device can increase the gain, and if the signal is too strong, the user device can decrease the gain. Thus, the AGC segment 211 may not encode any data.

The card reader can encode card information obtained from a payment card into multiple data segments, e.g., a data segment 214 and a data segment 217, that are each preceded by a preamble and a synchronization segment. For example, the data segment 214 is preceded by a preamble segment 212 and a synchronization segment 213, and the data segment 217 is preceded by its own preamble segment 215 and 216. The card reader can break up the card information from the card into multiple data segments, each having its own preamble and synchronization segment in order to improve the reliability of the signal transmission. Using multiple preamble and synchronization segments enables the user device to continually compensate for clock drift that may occur while the user device is receiving the signal.

Each preamble segment, e.g., the preamble segment 212, can be used by the user device to determine or refine a frequency of the signal data rate, initially, as well as before each subsequently received data segment. In some implementations, the initial preamble segment 212 used to determine the data rate in the first instance is longer than preamble segments elsewhere in the packet 210, e.g., preamble segment 215. In other words, the initial preamble segment 212 encodes more bits than other preamble segments. A longer preamble can increase the accuracy of determining a data rate from a signal. In some implementations, a preamble segment encodes all zeros or all ones so that each bit has two transitions when using self-clocking line codes, e.g., Manchester code. The user device can receive the signal and perform a fast Fourier transform process on a preamble segment of the signal to determine the frequency of the data rate based on frequency peaks in the output of the fast Fourier transform process.

Each synchronization segment, e.g., the synchronization segment 213, encodes a distinctive synchronization pattern. The user device can use the synchronization segment to align measurements of the received signal with determined midpoints between signal transitions in order to increase the accuracy of the signal reading. In other words, the user device can time the measurements of the signal such that the measurements are unlikely to occur near signal transitions.

A training synchronization segment 215 encodes a synchronization pattern that indicates, to the user device, the end of the packet 210. A final cyclic redundancy check (CRC) segment 219 encodes a value that the user device can use to detect errors in the received signal using a cyclic redundancy check process.

The fast format packet 220 and the slow format packet 230 each have the same general format as the example packet 210 and encode the same card information, possibly in multiple data segments. However, the initial preamble segment 232 of the slow format packet 230 is longer than the preamble segment 222 of the fast format packet 220. In other words, the initial preamble segment 232 of the slow format packet 230 encodes more bits than the preamble segment 222 of the fast format packet 220. Because the slow format packet 230 will ordinarily be used when demodulation of the fast format packet 220 has failed, possibly due to noise, the card reader can generate a longer preamble for the slow format packet 230 to increase the reliability of reading the card under noisy conditions. In some implementations, the card reader can further increase the reliability of the signal transmission by generating preamble segments of the slow format packet 230 that are each longer than corresponding preamble segments of the fast format packet 220.

The fast format packet 220 and the slow format packet 230 can be encoded in a single signal 240 that can be modulated and sent to a user device. The data rate of the signal 240 is higher for the portion corresponding to the fast format packet 220. In some implementations, the portion of the signal 240 corresponding to the fast format packet 220 has a bit rate at least three times higher, e.g., four times higher, than the portion of the signal corresponding to the slow format packet 230.

Figure 3:
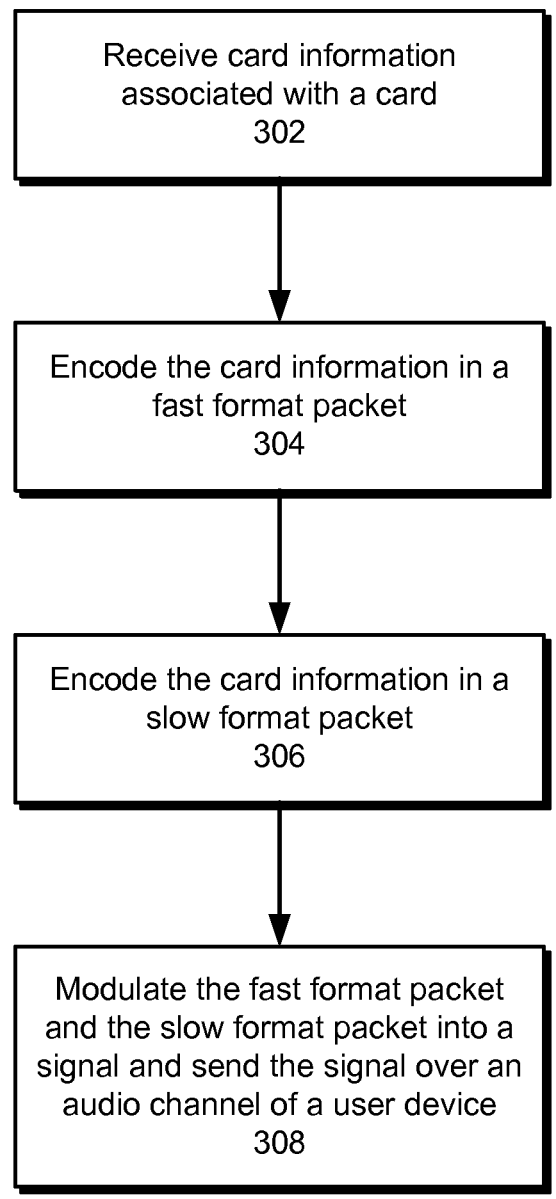
FIG. 3 is a flow chart of an example process for generating a signal that includes a fast format packet and a slow format packet.

FIG. 3 is a flow chart of an example process for generating a signal that includes a fast format packet and a slow format packet. The example process can be performed by any appropriately programmed data processing apparatus. The process will be described as being performed by a card reader coupled to a user device.

The card reader receives card information associated with a card (302). As described above, the card information can be obtained from a read head of the card reader after a payment card is swiped through the read head, read from an embedded chip, or otherwise obtained from the card.

The card reader encodes the card information in a fast format packet (304). The card reader can generate a fast format packet that has a format as described above with reference to FIG. 2. For example, the card reader can generate multiple data segments that encode the card information and can generate a respective preamble and synchronization segment for each of the multiple data segments. The card reader can also generate other segments for the fast format packet, e.g., a trailing CRC segment, as appropriate.

The card reader encodes the card information in a slow format packet (306). For example, the card reader can generate a slow format packet that has a format as described above with reference to FIG. 2. Similarly, the card reader can generate multiple data segments that each have a respective preamble and synchronization segment. However, the card reader need not regenerate every preamble, synchronization, and data segment. Rather, the card reader may reuse some preamble, synchronization, and data segments that were created during generation of the fast format packet. The card reader may also generate the slow format packet first and reuse one or more segments during generation of the fast format packet.

Some segments of the slow format packet may differ from corresponding segments of the fast format packet. For example, the card reader can generate preambles for the slow format packet that are longer than preambles of the fast format packet.

The card reader modulates the fast format packet and the slow format packet into a signal and sends the signal over an audio channel of the user device (308). Generally, the card reader will modulate the fast format packet at a data rate that is higher than the data rate for the slow format packet. The card reader can use any appropriate digital encoding and modulation techniques, e.g., a Manchester encoding with pulse-width modulation. In some implementations, the fast format packet is modulated at 6 kb/s and the slow format packet is modulated at 1.5 kb/s.

Although in the example process shown in FIG. 3 the card reader generates a fast format packet and a slow format packet, the card reader may also generate additional packets that are modulated at other speeds and sent to the user device as well. Generally, portions of the signal corresponding to packet formats having higher data rates are sent to the user device before portions of the signal corresponding to packet formats having lower data rates. In some implementations, the card reader sends multiple packets in order by decreasing data rate.

The user device will receive the signal and attempt to demodulate the portion of the signal corresponding to the fast format packet. However, the card reader can automatically continue to send a portion of the signal corresponding to the slow format packet before receiving any feedback from the user device as to whether or not demodulation of the fast format packet was successful.

Figure 4:
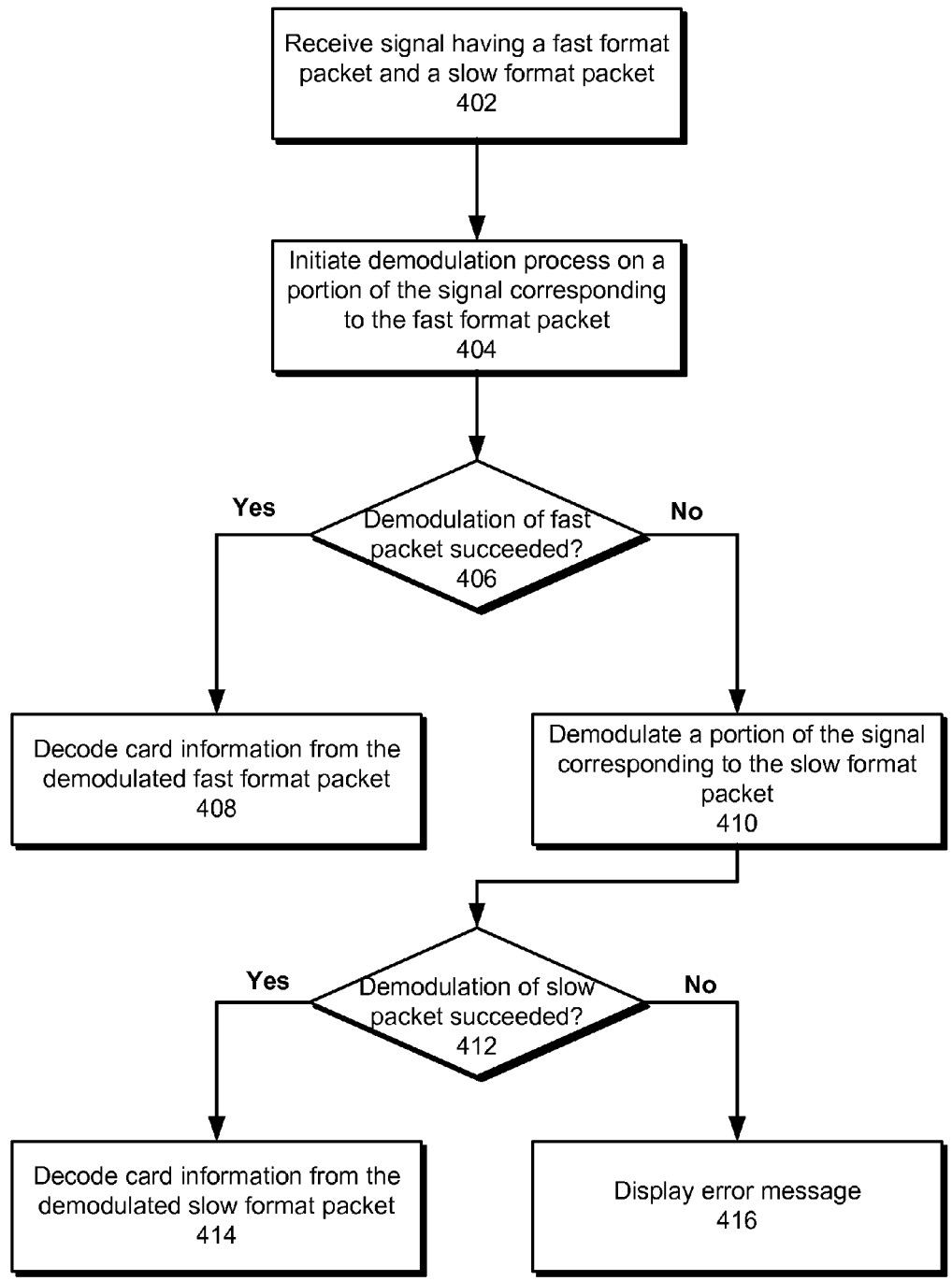
FIG. 4 is a flow chart of an example process for obtaining card information from a signal that includes a fast format packet and a slow format packet. Like reference numbers and designations in the various drawings indicate like elements.

FIG. 4 is a flow chart of an example process for obtaining card information from a signal that includes a fast format packet and a slow format packet. The example process can be performed by any appropriately programmed data processing apparatus. For example, the process can be implemented by a user application installed on a user device. The process will be described as being performed by a user device coupled to a card reader.

The user device receives a signal having a fast format packet and a slow format packet (402). For example, the user device can be programmed to continually monitor for signals received over a port of the user device, e.g., over an audio jack or headset jack to which a card reader is connected.

The user device initiates a demodulation process on a portion of the signal corresponding to the fast format packet (404). The user device can initiate the demodulation process when the user device detects an incoming signal. The user device can consider the first received portion of the signal to be the fast format packet.

In some implementations, the user device performs a high-pass finite impulse response filter to remove high frequency noise from the signal. The user device then performs a fast Fourier transform on the fast format packet preamble to estimate the data rate of the fast format packet. The user device then searches for the synchronization pattern segment of the fast format packet and generates a reference sine wave. The user device then integrates the reference sine wave with the data segment of the fast format packet to generate the bits of the original fast format packet. The user device may perform error correcting algorithms to account for noise or other kinds of errors, e.g., the Verterbi algorithm or cyclic redundancy check.

If demodulation of the fast format packet succeeds (406), the user device decodes card information from the demodulated fast format packet (branch to 408). The user device can then proceed to process a payment transaction using information obtained from the payment card. When demodulation of the fast format packet succeeds, the user device can ignore the portion of the signal corresponding to the slow format packet.

If demodulation of the fast format packet does not succeed (406), the user device initiates a demodulation process on a portion of the signal corresponding to the slow format packet (branch to 410). Before or during attempting demodulation of the fast format packet, the user device can continue to receive the signal from the card reader that corresponds to the slow format packet. The demodulation process for the slow format packet may be similar to the process used for the fast format packet, although the data rate for the slow format packet will be lower than the data rate for the fast format packet.

If demodulation of the slow format packet succeeds (412), the user device decodes card information from the demodulated slow format packet (414). The user device can then proceed to process a payment transaction using the decoded card information.

If demodulation of both the fast format packet and the flow format packet does not succeed (412), the user device can display a message indicating that reading of the card failed. For example, the user device can display an error message indicating that the user should swipe the card again (416).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and input devices for providing input to the computer, e.g., a keyboard, a mouse, or a presence sensitive surface or display. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method of communication between a card reader and a user device, comprising:
    receiving, from a read head of the card reader coupled to the user device, card information on a payment card;
    encoding the card information in a fast format packet to be sent to the user device at a first data rate;
    encoding the card information in a slow format packet to be sent to the user device at a second data rate lower than the first data rate;
    modulating the fast format packet and the slow format packet together into a signal that includes at least a first portion that corresponds to the fast format packet and at least a second portion that corresponds to the slow format packet and sending the signal over a communication port of the user device;
    initiating, at the user device, a demodulation process on the first portion of the signal that corresponds to the fast format packet;
    determining that the demodulation process on the portion of the signal that corresponds to the fast format packet has failed;
    in response to determining that the demodulation process on the portion of the signal that corresponds to the fast format packet has failed, demodulating the portion of the signal that corresponds to the slow format packet; and
    decoding the card information from the demodulated slow format packet.

2. The method of claim 1, further comprising:
    receiving the portion of the signal that corresponds to the slow format packet before or while performing the demodulation process on the portion of the signal corresponding to the fast format packet.

3. The method of claim 1, wherein sending, to the user device, the card information encoded in the first format and the second format comprises sending a portion of the signal corresponding to the fast format before a portion of the signal corresponding to the slow format.

4. A computer implemented method of communication between a card reader and a user device, comprising:
    receiving, from a read head of the card reader, card information associated with a card;
    encoding the card information in a first format to be sent to the user device at a first data rate;
    encoding the card information in a second format to be sent to the user device at a second data rate lower than the first data rate;
    sending, to the user device, the card information encoded in the first format and the second format together as a signal that includes at least a first portion that corresponds to the first format and at least a second portion that corresponds to the second format; and
    in response to determining that a demodulation process on the first portion of the signal that corresponds to the first format has failed, demodulating the second portion of the signal that corresponds to the second format.

5. The method of claim 4, wherein sending, to the user device, the card information encoded in the first format and the second format comprises sending the signal over an audio channel of the user device.

6. The method of claim 4, wherein sending, to the user device, the card information encoded in the first format and the second format comprises sending the signal over a data communications port of the user device.

7. The method of claim 4, wherein sending, to the user device, the card information encoded in the first format and the second format comprises sending the portion of the signal that corresponds to the slow format before or while the user device is performing a demodulation process on the portion of the signal corresponding to the fast format.

8. The method of claim 4, wherein sending, to the user device, the card information encoded in the first format and the second format comprises sending the portion of the signal corresponding to the fast format before sending the portion of the signal corresponding to the slow format.

9. A computer implemented method of communication between a card reader and a user device, comprising:
    receiving, from the card reader a signal that includes encoded card information associated with a card, wherein the card information is encoded in a first format received at a first data rate and a second format received at a second data rate that is lower than the first data rate, and the signal includes at least a first portion that corresponds to the first format and at least a second portion that corresponds to the second format;
    initiating a demodulation process on the portion of the signal that corresponds to the first format;
    determining that the demodulation process on the portion of the signal that corresponds to the first format has failed;
    in response to determining that the demodulation process on the portion of the signal that corresponds to the first format has failed, demodulating the portion of the signal that corresponds to the second format.

10. The method of claim 9, further comprising:
    receiving the portion of the signal that corresponds to the second format before or while performing the demodulation process on a portion of the signal corresponding to the first format.

11. The method of claim 9, wherein receiving, form the card reader, the signal card information associated with the card comprises receiving a portion of the signal corresponding to the first format before a portion of the signal corresponding to the second format.

12. The method of claim 9, wherein receiving, from the card reader, the signal card information associated with a card comprises receiving the signal over an audio channel of the user device.

13. The method of claim 9 wherein receiving, from the card reader, the signal card information associated with the card comprises receiving the signal over a data communications port of the user device.

14. A card reader configured to encode card information associated with a card obtained from a read head into a fast format to be sent to a user device at a first data rate, encode the card information in a slow format to be sent to the user device at a second data rate lower than the first data rate, send, to the user device, the card information encoded in the first format and the second format as a signal that includes at least a first portion that corresponds to the fast format and at least a second portion that corresponds to the slow format, and, in response to determining that the demodulation process on the portion of the signal that corresponds to the fast format has failed, demodulate the portion of the signal that corresponds to the slow format.

15. The card reader of claim 14, wherein the card reader is further configured to send, to the user device, the portion of the signal corresponding to the fast format before the portion of the signal corresponding to the slow format.

16. The card reader of claim 14, wherein the card reader is further configured to send a portion of the signal that corresponds to the slow format before or while the user device is performing a demodulation process on a portion of the signal corresponding to the fast format.

* * * * *